United States Patent
Bolger et al.

(10) Patent No.: US 9,586,597 B2
(45) Date of Patent: Mar. 7, 2017

(54) ELECTRIFIED VEHICLE OPERATING MODE PROMPT

(71) Applicant: FORD GLOBAL TECHNOLOGIES, LLC, Dearborn, MI (US)

(72) Inventors: Bryan Michael Bolger, Canton, MI (US); Angel Fernando Porras, Dearborn, MI (US); Christopher Adam Ochocinski, Canton, MI (US); William David Treharne, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 14/476,798

(22) Filed: Sep. 4, 2014

(65) Prior Publication Data

US 2016/0068168 A1  Mar. 10, 2016

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60W 50/14* | (2012.01) |
| *B60W 10/06* | (2006.01) |
| *B60W 10/08* | (2006.01) |
| *B60W 10/26* | (2006.01) |
| *B60W 20/00* | (2016.01) |
| *B60W 50/08* | (2012.01) |
| *B60K 6/445* | (2007.10) |

(52) U.S. Cl.
CPC ............. *B60W 50/14* (2013.01); *B60K 6/445* (2013.01); *B60W 10/06* (2013.01); *B60W 10/08* (2013.01); *B60W 10/26* (2013.01); *B60W 20/10* (2013.01); *B60W 20/20* (2013.01); *B60W 50/082* (2013.01); *B60W 2050/146* (2013.01); *B60W 2510/244* (2013.01); *B60W 2540/04* (2013.01); *B60W 2710/06* (2013.01); *B60W 2710/08* (2013.01); *B60W 2710/242* (2013.01); *Y02T 10/6286* (2013.01); *Y10S 903/93* (2013.01)

(58) Field of Classification Search
USPC . 701/1, 22, 24, 99, 102, 101, 112, 113, 117; 340/905, 438, 459, 461; 116/28.1; 180/197

See application file for complete search history.

(56) References Cited

U.S. PATENT DOCUMENTS

| | | |
|---|---|---|
| 5,539,399 A | 7/1996 | Takahira et al. |
| 8,004,234 B2 | 8/2011 | Walrath |
| 2004/0062963 A1 | 4/2004 | Umayahara et al. |
| 2006/0021811 A1* | 2/2006 | Kuang ................... B60K 6/365 180/65.25 |
| 2006/0167565 A1* | 7/2006 | Katrak ................. G05B 19/106 700/12 |
| 2009/0248265 A1* | 10/2009 | Tabata ................... B60K 6/365 701/59 |

(Continued)

*Primary Examiner* — Ronnie Mancho
(74) *Attorney, Agent, or Firm* — Carlson, Gaskey & Olds, P.C.

(57) ABSTRACT

An exemplary method includes prompting a user to change an operating mode of an electrified vehicle from a first mode to a second mode that is different than the first mode. The first mode is a default mode. The second mode is a non-default mode.

18 Claims, 3 Drawing Sheets

(56) References Cited

U.S. PATENT DOCUMENTS

| | | | |
|---|---|---|---|
| 2010/0188043 A1* | 7/2010 | Kelty | B60L 3/0046 |
| | | | 320/109 |
| 2010/0250039 A1* | 9/2010 | Bryan | B60K 6/445 |
| | | | 701/22 |
| 2011/0178654 A1 | 7/2011 | Bauerle et al. | |
| 2011/0307134 A1* | 12/2011 | Yoshimi | B60K 6/48 |
| | | | 701/22 |
| 2013/0173101 A1 | 7/2013 | Gilman et al. | |
| 2013/0173102 A1 | 7/2013 | Aldighieri et al. | |
| 2013/0274968 A1* | 10/2013 | Federico | B60H 1/00735 |
| | | | 701/22 |
| 2014/0114512 A1 | 4/2014 | Treharne et al. | |
| 2014/0114514 A1 | 4/2014 | Crombez et al. | |
| 2014/0210608 A1* | 7/2014 | Yamada | G07C 5/00 |
| | | | 340/459 |
| 2015/0127203 A1* | 5/2015 | Kashiba | B60W 10/24 |
| | | | 701/22 |

* cited by examiner

ELECTRIFIED VEHICLE OPERATING MODE PROMPT

TECHNICAL FIELD

This disclosure relates generally to a prompt and, more particularly, to prompting a user to change an operating mode of the electrified vehicle to a non-default operating mode.

BACKGROUND

Generally, electrified vehicles differ from conventional motor vehicles because electrified vehicles include one or more electric machines powered by batteries. Electric power from the electric machines can selectively drive the vehicle. Conventional motor vehicles, in contrast to electrified vehicles, are driven exclusively by an internal combustion engine. Example electrified vehicles include hybrid electric vehicles (HEVs), plug-in hybrid electric vehicles (PHEVs), and battery electric vehicles (BEVs).

Electrified vehicles have various operating modes. These operating modes can control how the vehicle is driven. For example, whether the vehicle is driven using an electric drive system, an internal combustion engine, or both

SUMMARY

A method according to an exemplary aspect of the present disclosure includes, among other things, prompting a user to change an operating mode of an electrified vehicle from a first mode to a second mode that is different than the first mode. The first mode is a default mode. The second mode is a non-default mode.

In a further non-limiting embodiment of the foregoing method, the electrified vehicle is driven using electric power when operated in the first mode.

In a further non-limiting embodiment of any of the foregoing methods the electrified vehicle is driven while enabling power from an internal combustion engine when operated in the second mode.

In a further non-limiting embodiment of any of the foregoing methods, the method includes prompting during a start of a new drive cycle.

In a further non-limiting embodiment of any of the foregoing methods, the electrified vehicle operated in the second mode when ending a prior drive cycle. The prior drive cycle immediately preceding the new drive cycle.

In a further non-limiting embodiment of any of the foregoing methods, changing the operating mode changes how the electrified vehicle prioritizes using electric power from a battery to drive the vehicle.

In a further non-limiting embodiment of any of the foregoing methods, the prompting comprises displaying a message to the user.

In a further non-limiting embodiment of any of the foregoing methods, the message comprises text on a display within the electrified vehicle.

In a further non-limiting embodiment of any of the foregoing methods, the method includes receiving an input from the user to change the operating mode to the second mode. The input is in response to the prompting.

A system according to another example aspect of the present disclosure includes, among other things, a controller that initiates a prompt to change an operating mode of an electrified vehicle from a first mode to a second mode that is different than the first mode. The first mode is a default mode. The second mode is a non-default mode.

In a further non-limiting embodiment of the foregoing system, the first mode causes the electrified vehicle to be driven using electrical power from an electric drive system.

In a further non-limiting embodiment of any of the foregoing systems, the second mode causes the electrified vehicle to be driven while enabling power from an internal combustion engine.

In a further non-limiting embodiment of any of the foregoing systems, the controller initiates the prompt when starting a new drive cycle of the electrified vehicle.

In a further non-limiting embodiment of any of the foregoing systems, the controller initiates the prompt if the electrified vehicle operated in the second mode when ending a prior drive cycle. The prior drive cycle immediately preceding the new drive cycle.

In a further non-limiting embodiment of any of the foregoing systems, the system includes a battery to selectively provide electrical power for powering the electrified vehicle. A change in the operating mode changing how the electrified vehicle prioritizes using electrical power from the battery.

In a further non-limiting embodiment of any of the foregoing systems, the system includes a display that visually displays the prompt.

In a further non-limiting embodiment of any of the foregoing systems, the prompt comprises text.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to prompting a user to change an operating mode of a powertrain for an electrified vehicle from a default mode to a non-default mode. The prompting is typically during a start-up of the electrified vehicle.

Figure 1:
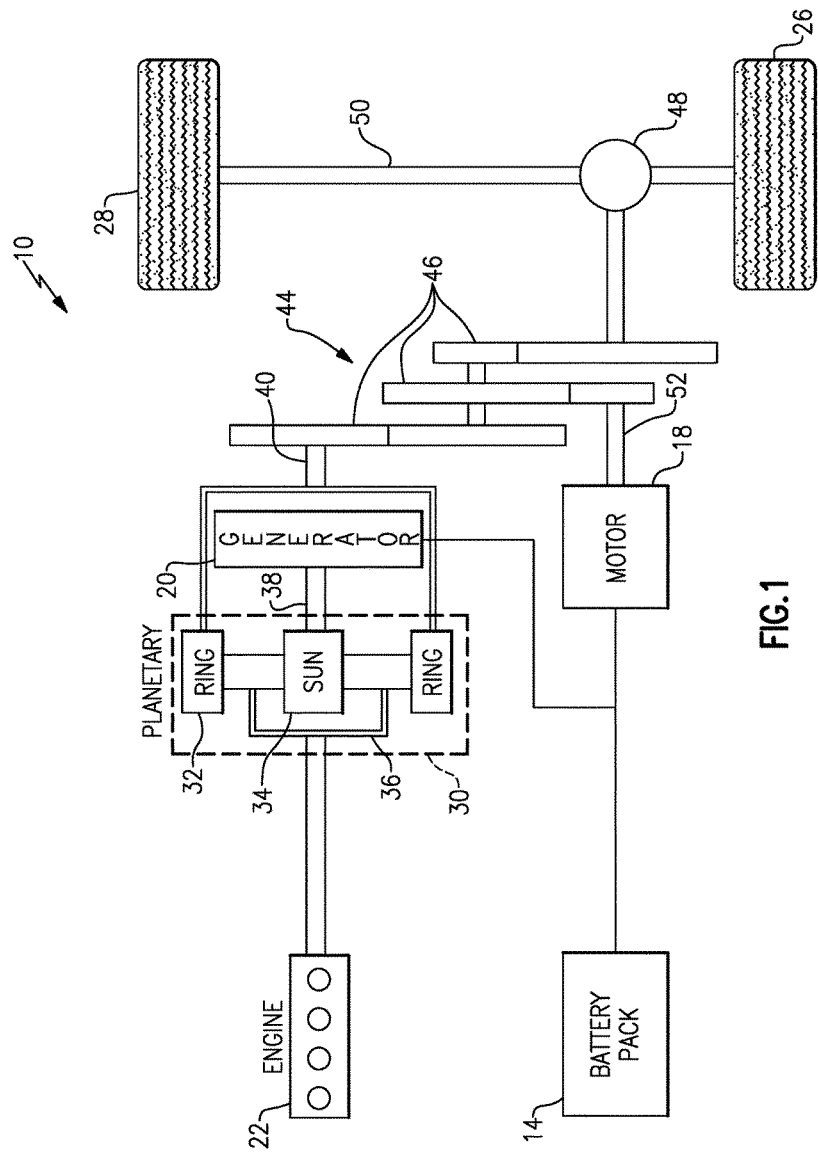
FIG. 1 is a schematic view of a powertrain of an example electrified vehicle.

Referring to FIG. 1, a powertrain 10 for a plug-in hybrid electric vehicle (PHEV) includes a battery pack 14, a motor 18, a generator 20, and an internal combustion engine 22.

The motor 18 and generator 20 are types of electric machines. The motor 18 and generator 20 may be separate or may have the form of a combined motor-generator.

In this embodiment, the powertrain 10 is a power-split powertrain system that employs a first drive system and a second drive system. The first and second drive systems can both generate torque to drive one or more sets of vehicle wheels 26 of the electric vehicle. The first drive system includes a combination of the engine 22 and the generator 20. The second drive system includes at least the motor 18, the generator 20, and the battery pack 14. The motor 18 and the generator 20 are portions of an electric drive system of the powertrain 10.

The engine 22, which is an internal combustion engine in this example, and the generator 20 may be connected through a power transfer unit 30, such as a planetary gear set. Of course, other types of power transfer units, including other gear sets and transmissions, may be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30. Because the generator 20 is operatively connected to the engine 22, the speed of the engine 22 can be controlled by the generator 20.

The ring gear 32 of the power transfer unit 30 can be connected to a shaft 40, which is connected to vehicle wheels 26 through a second power transfer unit 44. The second power transfer unit 44 may include a gear set having a plurality of gears 46. Other power transfer units may also be suitable. The gears 46 transfer torque from the engine 22 to a differential 48 to ultimately provide traction to the vehicle wheels 26. The differential 48 may include a plurality of gears that enable the transfer of torque to the vehicle wheels 26. In this example, the second power transfer unit 44 is mechanically coupled to an axle 50 through the differential 48 to distribute torque to the vehicle wheels 26.

The motor 18 can also be employed to drive the vehicle wheels 26 by outputting torque to a shaft 52 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery pack 14.

Figure 2:
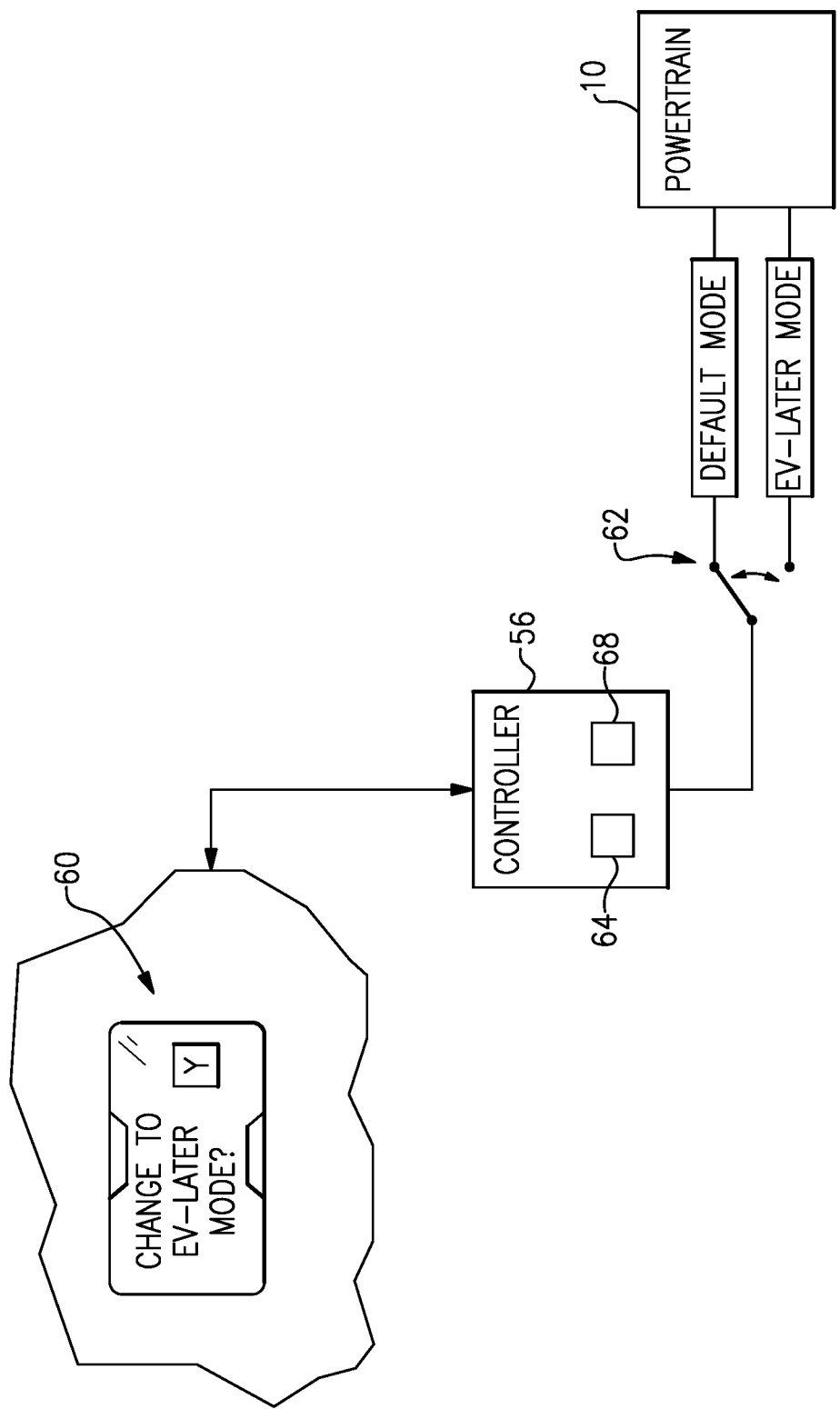
FIG. 2 is a partial schematic view of a control system used in connection with the powertrain of FIG. 1.

Referring now to FIG. 2 with continuing reference to FIG. 1, a controller 56 is used in connection with the powertrain 10 and an in-vehicle display 60. The controller 56, among other things, prioritizes using the first drive system, the second drive system, or both, to drive the vehicle wheels 26.

The example controller 56 controls whether the powertrain 10 operates in one of the default modes (EV-NOW and EV-AUTO) or a non-default mode (EV-LATER). A user of the vehicle, such as the driver, can initiate a switch of the operating modes during the drive cycle if desired. The switching is represented schematically in FIG. 2 by switch 62. Unless switched, the powertrain 10 continues to operate in one of the operating modes until the drive cycle ends and the powertrain 10 is turned off.

When the controller 56 causes the powertrain 10 to operate in the EV-NOW operating mode, the second drive system, which is the electric drive system, is used to drive the vehicle wheels 26. When electrical power from the battery pack 14 has depleted, the powertrain 10 switches to using the first drive system to drive the vehicle wheels 26 instead of the second drive system. The first drive system uses the internal combustion engine 22 to drive the vehicle wheels 26.

When the controller 56 causes the powertrain 10 to operate in the EV-LATER operating mode, the first drive system or the second drive system is used based on a level of electrical power stored within the battery pack 14. The powertrain 10 utilizes the first drive system to drive the vehicle wheels 26 when a level of electrical power stored within the battery pack 14 is below a threshold level of charge, say 80 percent. If the battery pack 14 charges above the threshold value, the powertrain 10 switches to the electric drive system. The EV-LATER operating mode effectively operates the powertrain 10 in a way that maintains a threshold level of electrical energy stored within the battery pack 14.

Notably, the internal combustion engine 22 may charge the battery pack 14 in addition to driving the vehicle wheels 26. Regenerative braking could also generate power to charge the battery pack 14.

In the EV-AUTO operating mode, the second drive system is primarily used to drive the vehicle wheels 26. When additional torque is required, the first drive system may combine with the second drive system to drive the vehicle wheels 26.

To fulfill requirements, the electrified vehicle may be required to start in certain operating modes. The requirements may be governmental requirements, internal requirements for a manufacturer of the electrified vehicle, etc.

For purposes of this disclosure, an operating mode that is acceptable when starting the electrified vehicle is considered a default mode. If requirements will not permit the electric vehicle to use a particular operating mode when the electrified vehicle is started, that operating mode is considered a non-default operating mode.

In this example, default operating modes include the EV-AUTO operating mode or the EV-NOW operating mode. The powertrain 10 thus must operate in the EV-AUTO or the EV-NOW operating mode when the vehicle is started.

Regulations require starting in either the EV-NOW or EV-AUTO operating mode because these modes, among other things, rely more heavily on electric power, and thus conserve fuel consumed by the internal combustion engine.

Typically, if the vehicle was shut down when the powertrain 10 was in the EV-NOW operating mode, the vehicle would start with the powertrain 10 in the EV-NOW mode. Similarly, if the vehicle was shut down when the powertrain 10 was in the EV-AUTO operating mode, the vehicle would start with the powertrain 10 in the EV-AUTO mode.

If, however, the electrified vehicle was shut-down while operating in the EV-LATER operating mode, the electrified vehicle would start-up during the next drive cycle in the EV-AUTO operating mode, or, optionally, EV-NOW.

The example controller 56 includes a processor 64 operatively linked to a memory portion 68. The example processor 64 is programmed to execute a program stored in the memory portion 68. The program may be stored in the memory portion 68 as software code.

The program stored in the memory portion 68 may include one or more additional or separate programs, each of which includes an ordered listing of executable instructions for implementing logical functions.

The processor 64 can be a custom made or commercially available processor, a central processing unit (CPU), an auxiliary processor among several processors associated with the controller 56, a semiconductor based microprocessor (in the form of a microchip or chip set) or generally any device for executing software instructions.

The memory portion 68 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor 64.

Figure 3:
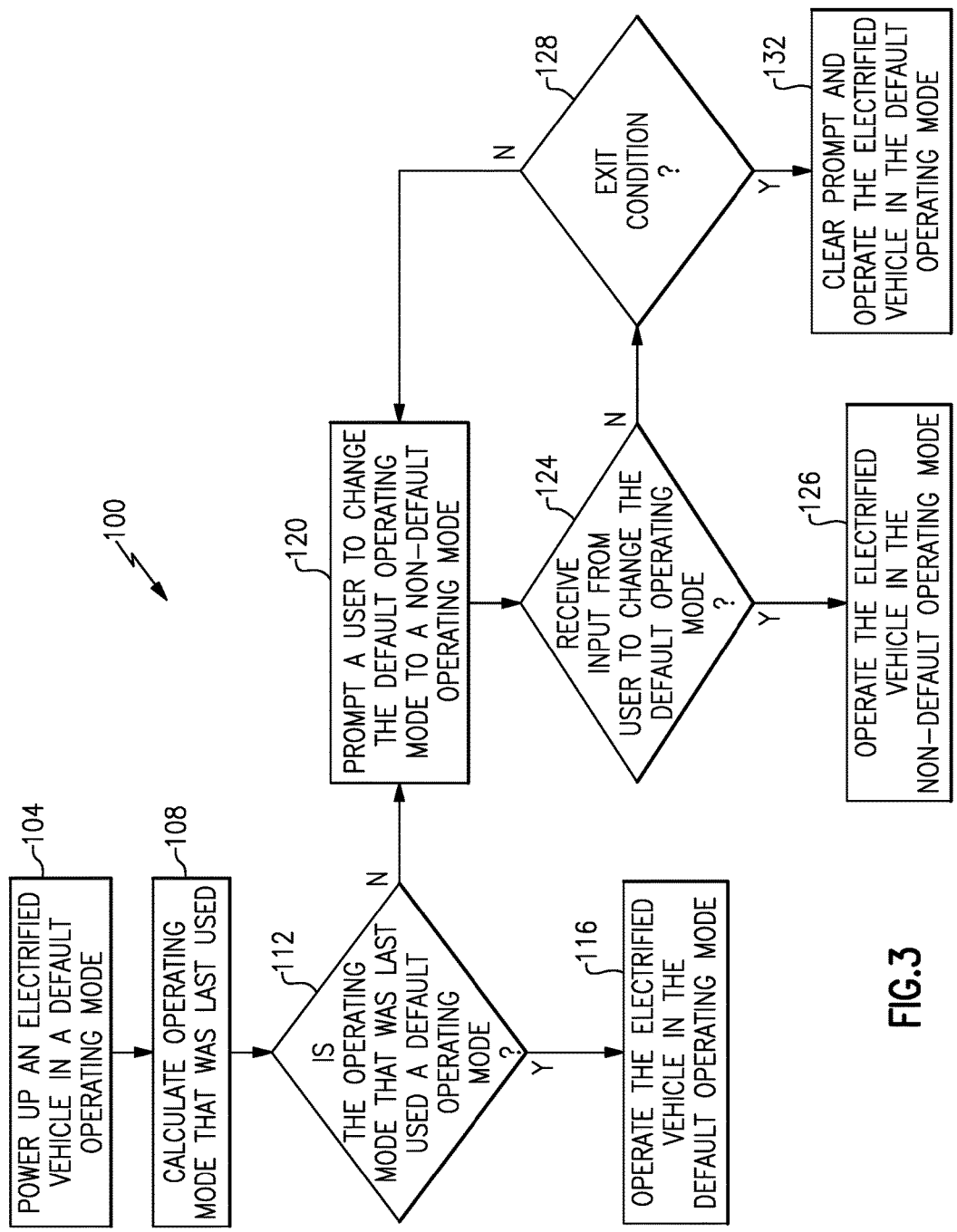
FIG. 3 shows a flow of an example method executed by the control system of FIG. 2.

Referring now to FIG. 3 with continuing reference to FIGS. 1 and 2, the example controller 56 executes a method 100 when starting the electric vehicle having the powertrain 10. The method 100 prompts the user to cause the powertrain 10 to return to a non-default operating mode if the vehicle was shut-down when operating in that non-default operating mode.

At a step 104, the electrified vehicle starts a new drive cycle by powering up the vehicle from a shut-down condition. The electrified vehicle is powered up and begins to operate in a default operating mode, such as the EV-NOW or the EV-AUTO operating modes.

At a step 108, the controller 56 calculates the last-used operating mode, which is the operating mode that was used when ending the drive cycle immediately prior to the new drive cycle.

The method 100 then calculates at a step 112 if the last-used operating mode was a default operating mode. If yes, the controller 56 operates the powertrain 10 of the electrified vehicle in that default operating mode at a step 116 and the method 100 ends. The powertrain 10 continues to operate in that default operating mode until a user initiates a change If the last-used operating mode was a non-default operating mode, the method moves to a step 120 where the user is prompted to change the operating mode to a non-default operating mode, such as the non-default operating mode that was last-used when the vehicle was shut-down.

The prompting in the step 120 may take many forms. In some examples, the prompting may be a text-based message on the display 60 within an interior of the vehicle. In another example, the prompting may be an audio message, or a combination of the text-based message and an audio message.

In this example, the prompting poses a question asking the user, if the user would like to change the powertrain 10 to operate in an EV-LATER operating mode, which is a non-default operating mode. The user can choose to ignore or respond to the prompting.

At a step 124, the method 100 receives input from the user to change the operating mode. If the input indicates that the user does want to change the operating mode, the method moves to the step 128 where the operating mode of the vehicle is changed to the non-default operating mode, in this case the EV-LATER operating mode. The input may be the user pressing a virtual button on the display 60.

If input from the user is not received, the method 100 moves to a step 128 to determine if an exit condition exists such that the prompting initiated at the step 120 can be removed. Example exit conditions may include a timeout, such as the pop-up remaining on the display 60 for 10 seconds and if no input is received, the pop-up being cleared from the display. The satisfaction of an exit condition is represented by the step 132. Another example exit condition may be a gear shift, such as the user putting the electric vehicle into a drive gear. If an exit condition is not received at the step 128, the method returns to the step 120 and the prompt continues to be displayed.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method, comprising:
controlling a device with a controller to prompt a user to change an operating mode of a vehicle from a default first mode where the vehicle is driven using electric power, to a non-default second mode that is different than the first mode, the prompting during a start of a new drive cycle where the vehicle is in a non-drive gear and powered up from a shut-down condition.

2. The method of claim 1, wherein the vehicle is driven while enabling power from an internal combustion engine when operated in the second mode.

3. The method of claim 1, wherein the vehicle is operated in the second mode when ending a prior drive cycle, the prior drive cycle immediately preceding the new drive cycle.

4. The method of claim 1, wherein changing the operating mode changes how the vehicle prioritizes using electric power from a battery to drive the vehicle.

5. The method of claim 1, wherein the prompting comprises displaying a message to the user.

6. The method of claim 5, wherein the message comprises text on a display within the vehicle.

7. The method of claim 1, including receiving an input from the user to change the operating mode to the second mode, the input in response to the prompting.

8. A system, comprising:
a battery to selectively provide electrical power for powering an electrified vehicle; and
a controller that controls a device to initiate a prompt to a user to change an operating mode of the electrified vehicle from a first mode to a second mode that is different than the first mode, the first mode a default mode, the second mode a non-default mode, wherein the controller initiates the prompt when the electrified vehicle is in a non-drive gear and is powered on from a shut-down condition at the start of a new drive cycle, and a change in the operating mode changes how the electrified vehicle prioritizes usage of electrical power from the battery.

9. The system of claim 8, wherein the first mode causes the electrified vehicle to be driven using electrical power from an electric drive system.

10. The system of claim 9, wherein the second mode causes the electrified vehicle to be driven while enabling power from an internal combustion engine.

11. The system of claim 8, wherein the controller initiates the prompt if the electrified vehicle is operated in the second mode when ending a prior drive cycle, the prior drive cycle immediately preceding the new drive cycle.

12. The system of claim 8, including a display that visually displays the prompt.

13. The method of claim 3, wherein the vehicle is shut down at a conclusion of the prior drive cycle.

14. The system of claim 11, wherein the electrified vehicle is shut down when ending the prior drive cycle.

15. The method of claim 1, further comprising prompting prior to putting the vehicle in a drive gear.

16. A method, comprising:
controlling a device with a controller to prompt a user to change an operating mode of an vehicle from a default, first mode where the vehicle is driven using electric power, to a different, non-default second mode, the prompting during a start of a new drive cycle where the vehicle is powered up from a shut-down condition, wherein changing the vehicle from a non-drive gear to a drive gear stops the prompting.

17. The system of claim 8, wherein the controller initiates the prompt prior to the electrified vehicle shifting to a drive gear.

18. A system, comprising:
a controller that controls a device to initiate a prompt to a user to change an operating mode of an electrified vehicle from a default, first mode that causes the electrified vehicle to be driven using electrical power from an electric drive system to a non-default, second mode, the controller initiating the prompt when the electrified vehicle is powered on from a shut-down condition at the start of a new drive cycle, wherein the controller stops the prompt in response to a user placing the electrified vehicle in a drive gear rather than a non-drive gear.

\* \* \* \* \*